May 30, 1967 L. M. COOLEY 3,322,438
MULTIPLE PLANTER FRAMES
Filed Aug. 6, 1965 2 Sheets-Sheet 1
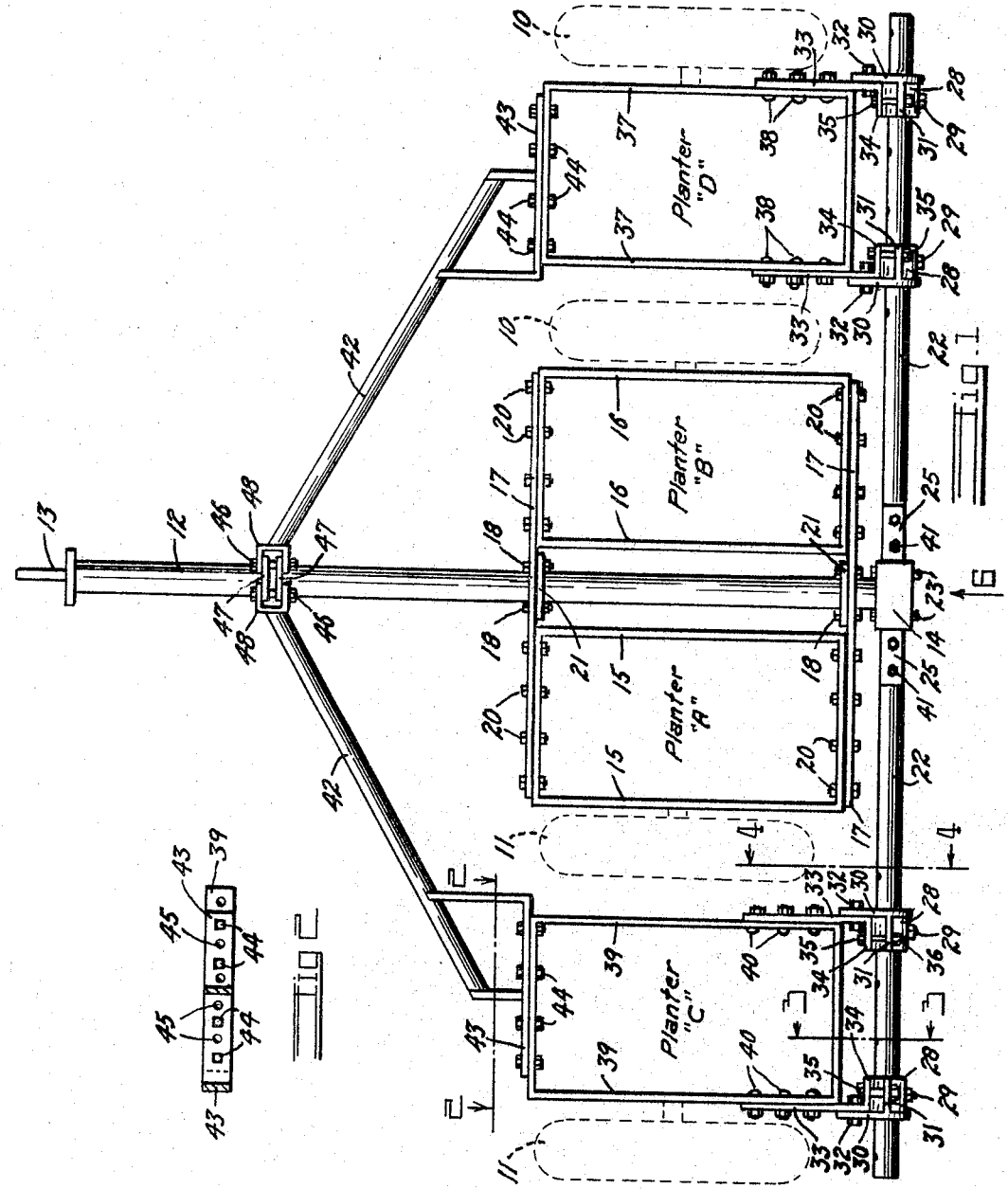
INVENTOR.
LESTER M. COOLEY
BY
ATTORNEY

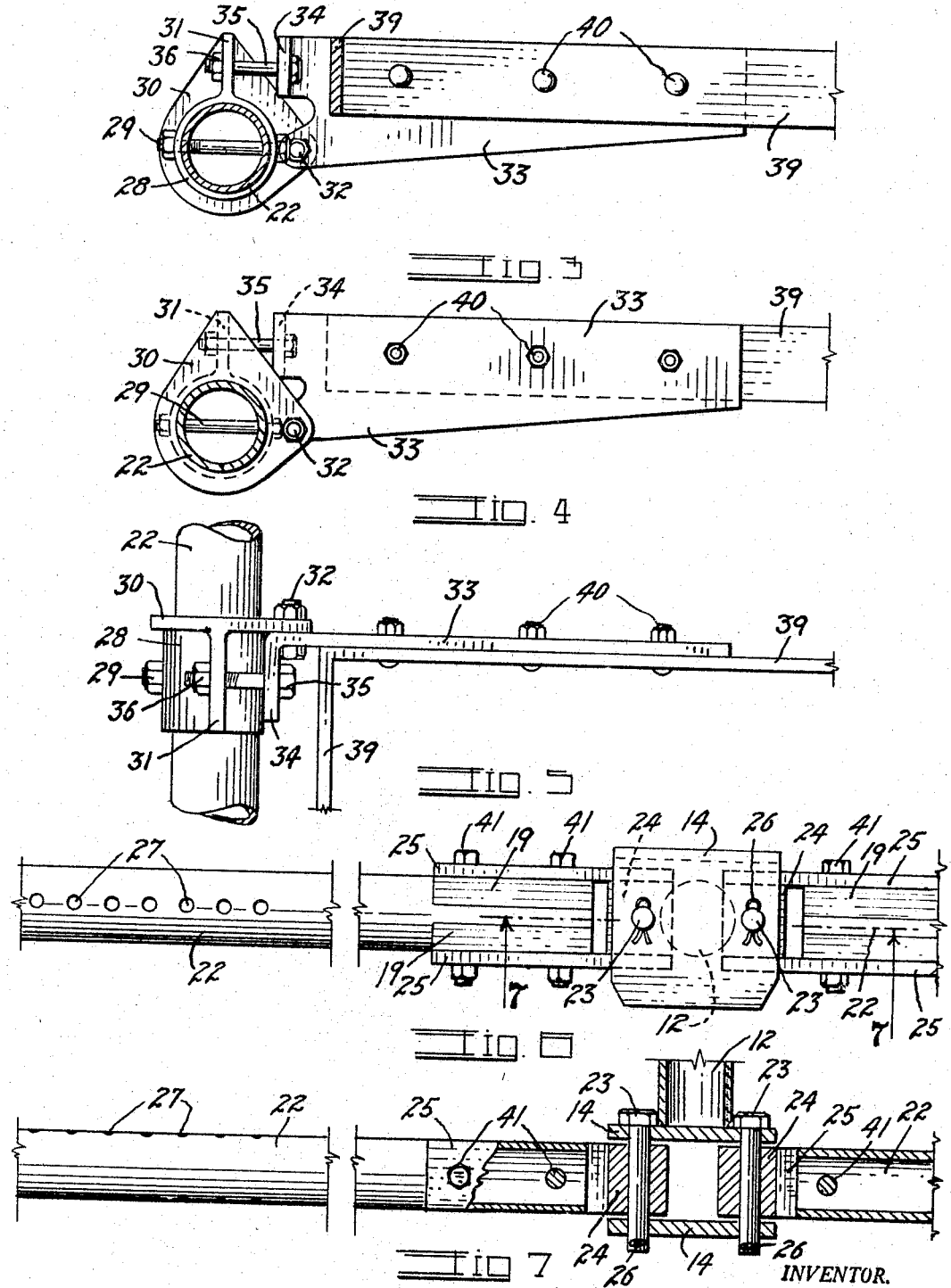

United States Patent Office

3,322,438
Patented May 30, 1967

3,322,438
MULTIPLE PLANTER FRAMES
Lester M. Cooley, Gering, Nebr., assignor, by mesne assignments, to Seilon, Inc., Toledo, Ohio, a corporation of Delaware
Filed Aug. 6, 1965, Ser. No. 477,757
5 Claims. (Cl. 280—412)

ABSTRACT OF THE DISCLOSURE

Outriggers pivotally mounted on the rear extremity of a tractor-towed tongue member and extending oppositely outward in T-shaped relation to said tongue member to flexibly support a third and a fourth planter frame laterally outward beyond a first and a second planter frame mounted upon opposite sides of said tongue member.

---

This invention relates to a frame for supporting a plurality of conventional seed planters, more particularly potato planters, behind a towing tractor and has for its principal object the provision of a frame which will combine four, transversally-aligned, conventional planters so that they may be simultaneously drawn along the planting rows with each planter operating independently of the others so that one pass of the tractor will simultaneously and effectively plant four rows of plants.

Another object of the invention is to provide an improved multiple planter frame in which the planters can be quickly, efficiently and individually levelled and adjusted to conform to a common, uniform, planting plane.

A further object is to so construct the frame that the outermost planters in the frame can be readily swung aside to provide easy access to all planting units for inspection, correction and repair.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a plan view of the multiple planter frame of this invention with the conventional planter assemblies omitted;

FIG. 2 is a detail cross section taken on the line 2—2, FIG. 1;

FIG. 3 is an enlarged, fragmentary, detail cross section taken on the line 3—3, FIG. 1;

FIG. 4 is a similar cross section taken on the line 4—4, FIG. 1;

FIG. 5 is a fragmentary, top view of the elements of FIG. 3;

FIG. 6 is a fragmentary, rear elevational view looking in the direction of the arrow 6 in FIG. 1; and FIG. 7 is a longitudinal section taken on the line 7—7, FIG. 6.

The planters, per se, form no part of the present invention they may be of any suitable conventional type such as "Iron Age" planters. The positions of the planters are indicated in FIG. 1 by the legends "Planter A," "Planter B," "Planter C" and "Planter D." The planters B and D are of the right-hand type and when in place in the planter frame their drive wheels will be positioned as indicated in broken lines at 10 while the planters A and C are of the opposite hand and their drive wheels will be positioned as indicated in broken lines at 11.

The improved multiple planter frame, when the planters are in place therein, is supported on the wheels 10 and 11 of the planters.

The multiple frame structure employs a tubular tongue member 12 terminating at its forward extremity in a suitable tractor hitch 13 and fixedly secured, such as by welding, to an open-bottomed, channel-shaped bearing box 14 of inverted, U-shaped cross section at its rear extremity.

A rectangular planter frame 15 is positioned at one side of, and adjacent the rear of, the tongue member 12 to receive planter A and a similar, rectangular planter frame 16 is positioned on the other side of the tongue member opposite the frame 15, to receive the planter B. The two frame members are rigidly maintained in parallel position by means of two cross bars 17 which extend transversally across the tongue member 12. The cross bars 17 are bolted, as indicated at 18, to flanges 21 which are welded, or otherwise secured, to the top of the tongue member 12 in spaced relation. The cross bars 17 and the planter frames 15 and 16 are each provided with aligned, spaced-apart, bolt holes into which bolts 20 may be inserted to secure the planter frames at any desired distance from the tongue member.

When the planters A and B are in place in the frames 15 and 16, they are in fixed, preset relation to the tongue member 12 and move simultaneously therewith. The tongue member is supported by the inner wheels 10 and 11 of the innermost planters and by the tractor hitch 13 and, as thus far described, the structure would effectively provide a highly efficient, two-row, planter assembly.

To mount the additional outer planters C and D so as to provide a four-row planter, two tubular outriggers 22 are extended oppositely outward from the bearing box 14 at the rear extremity of the tongue member 12. The inner extremities of the two outriggers 22 are pivotally and oppositely mounted at the rear extremity of the tongue member 12 so that they may swing in a vertical plane perpendicular to the axis of the tongue member. Any suitable pivot structure may be employed. As illustrated, a bearing block 24 is supported in spaced relation to the inner extremity of each outrigger by a pair of mounting straps 25 secured to the top and bottom of said inner extremity by means of attachment bolts 41. The bearing blocks 24 are pivotally mounted on horizontal pivot pins 23 which extend through the sides of the bearing box 14 in parallel relation to each other and in parallel relation to the axis of the tongue member. The pivot pins are retained in place by means of suitable cotter keys 26.

To facilitate the interfitting of the inner extemities of the outriggers into the bearing box 14 and to facilitate the mounting of the straps 25 thereon, corner collets 19 are welded on the inner extremities to bring the latter to a square external cross-section.

Each outrigger 22 is provided with longitudinally-aligned, spaced-apart, horizontal bolt holes 27 for securing a pair of mounting sleeves 28 in any desired longitudinal positions along each outrigger by means of diametrically-extending anchor bolts 29.

The mounting sleeves 28 of each pair are similar but of opposite hand and each is provided with a mounting flange 30 from which an upstanding rib 31 extends, along the top of the sleeve, and from which a hinge bolt 32 extends parallel to the axis of the sleeve.

A hinge plate 33 is pivotally mounted on each hinge bolt 32 and extends forwardly therefrom, as shown in FIGS. 3–5. Each hinge plate 33 is provided with an angular inwardly-turned extremity 34 which is positioned forwardly of and in parallel relation to the rib 31 of the mounting sleeve above the hinge bolt 32. A tension bolt 35 extends through the turned extremity 34 and through the rib 31 of the sleeve. The tension bolt is provided with an adjusting nut 36 which when tightened raises the forward extremity of the hinge plate 33 about the axis of the hinge bolt 32 and which acts as an adjustable stop to limit the downward swing of the hinge plate 33 about the axis of the hinge bolt 32.

A third rectangular, forwardly-extending, open planter frame 37 is mounted between the pair of hinge plates 33 on one of the outriggers 22, by means of suitable attachment bolts 38 to receive and support the conventional planter D. A similar, forwardly-extending, open, rectangular, planter frame 39 is similarly mounted between the pair of hinge plates 33 on the other outrigger 22 by means of atachment bolts 40 to receive the conventional planter C. With the planters C and D in place the frames 37 and 39 will be supported on the wheels 10 and 11 of their respective planters.

The planter frames 37 and 39 are maintained in parallel alignment with the planter frames 15 and 16 by means of diagonal braces 42 extending forwardly and inwardly to the tongue 12. The braces 42 are provided with horizontal foot plates 43 which are adjustably mounted on the forward ends of each of the outer planter frames 37 and 39 by means of bolts 44. The planter frames 37 and 39 are provided with a plurality of uniformly-spaced, horizontally-aligned bolt holes 45, as shown in FIG. 2, to selectively receive the bolts 44, thus providing for inward and outward adjustment of the planter frames 37 and 39 to and from the tongue member 12. The forward extremities of the diagonal braces 42 terminate in vertical, U-shaped, hinge clips 48 which are hingedly mounted on hinge bolts 46 extending through spaced-apart mounting flanges 47 attached to or welded on the tongue member 12 rearwardly of the tractor hitch 13.

Thus, any desired row spacing can be provided by: shifting the planter frames 15 and 16 along the cross bars 17; shifting the planter frames 37 and 39 along the foot plates 43; and shifting the mounting sleeves 28 along the outriggers 22.

When the multiple planter is resting on a level floor, the outer planter frames 37 and 39 can be adjusted to lie in the plane of the inside planter frames 15 and 16 by proper adjustment of the nuts 36 on the tension bolts 35. In the field, the outer planter frames are free to follow the ground contour passing under the outer wheels since the entire assemblies at each side of the inside planters are free to move upwardly and downwardly upon the pivot pins 23 and the hinge bolts 46. Thus the outside planters independently maintain the proper planting depth.

Should it be desired to separate the planters to obtain access for adjustments, replacements or repairs it is only necessary to remove the hinge bolts 46 and one bolt from each pair of bolts 41. The outriggers 22 can then be swung rearwardly on the remaining bolts 41 of each pair to swing the planters C and D away from the planters A and B.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A multiple planter frame for supporting a plurality of crop planters in transverse alignment comprising: an elongated tongue member; means for attaching the forward extremity of said tongue member to a towing vehicle; means for supporting a first and a second crop planter on opposite sides of said tongue member intermediate the extremities of the latter; elongated outriggers secured to the rear extremity of said tongue member and extending oppositely outward therefrom; a planter frame adjustably mounted on each outrigger and extending forwardly therefrom to a position alongside of, but laterally beyond, said first and second crop planters for supporting a third and fourth crop planter; braces extending between said tongue and the forward extremities of said planter frames to mantain the latter in parallel relation to said tongue member, said braces being pivotally mounted on said tongue member so that said planter frames may move vertically and independently of said first and second crop planters; mounting sleeves surrounding said outriggers and being slidable longitudinally of the latter; means for securing said planter frames to said sleeves; and anchor means for locking said sleeves in desired positions along said outriggers.

2. A multiple planter frame as described in claim 1 having means for pivotally mounting said planter frames on said sleeves so that the planter frames may be swung upwardly and downwardly relative to said outriggers.

3. A multiple planter frame as described in claim 1 having: flangess formed on said sleeves; hinge plates secured to said planter frames; and pivot means pivotally securing said hinge plates to said flanges so that said planter frames may be swung upwardly and downwardly relative to said outriggers.

4. A multiple planter frame as described in claim 3 having adjustable stop means for limiting the degree of downward swing of said planter frames.

5. A multiple planter frame as described in claim 4 in which the stop means comprises upstanding ribs on said sleeves; angularly-turned extremities on said hinge plates positioned above said pivot means and forwardly of said ribs; and an adjustable tension member extending between each angularly turned extremity and the adjacent rib to limit the amount of separation of said extremities and said ribs.

References Cited

UNITED STATES PATENTS

| | | | |
|---|---|---|---|
| 2,708,397 | 5/1955 | Cook et al. | 172—310 |
| 2,710,200 | 6/1955 | French | 280—411 |
| 3,028,177 | 4/1962 | French | 280—411 |
| 3,240,508 | 3/1966 | Clausen et al. | 280—411 X |

LEO FRIAGLIA, *Primary Examiner.*